April 21, 1936.　　　I. G. LINDSTEDT　　　2,037,805
RETRACTABLE STEP FOR STREAMLINE RAILWAY CARS
Filed Aug. 17, 1934　　　2 Sheets-Sheet 1
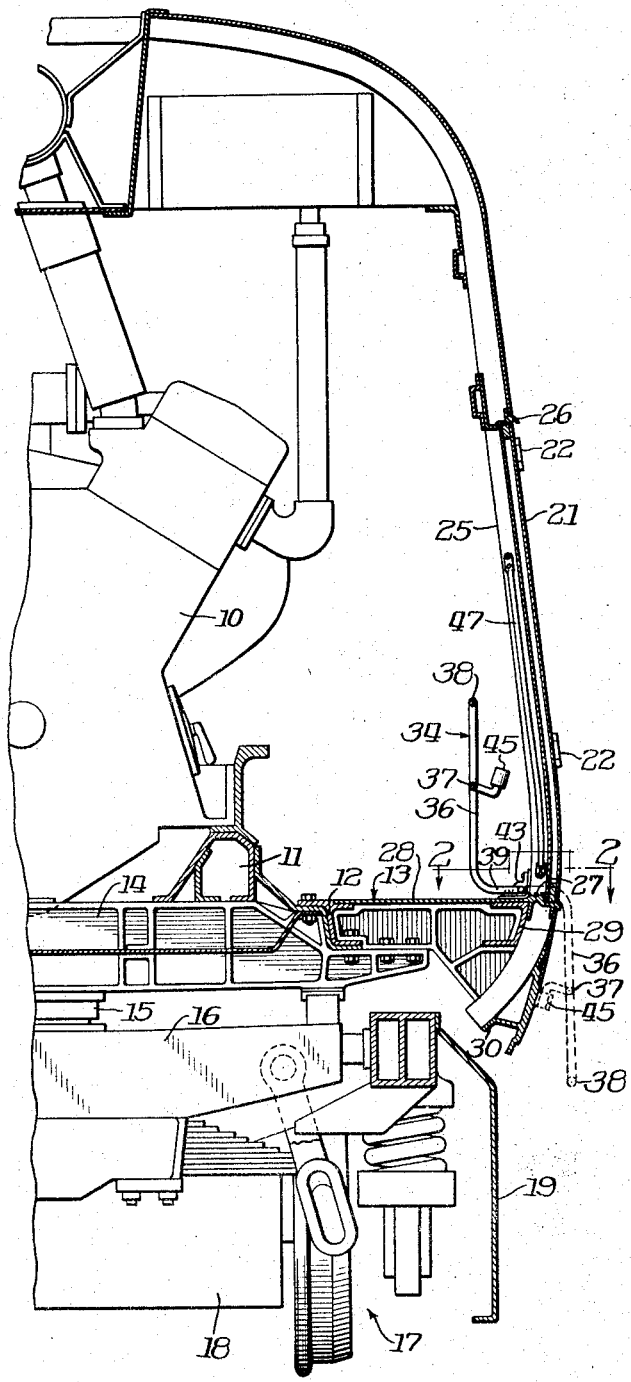
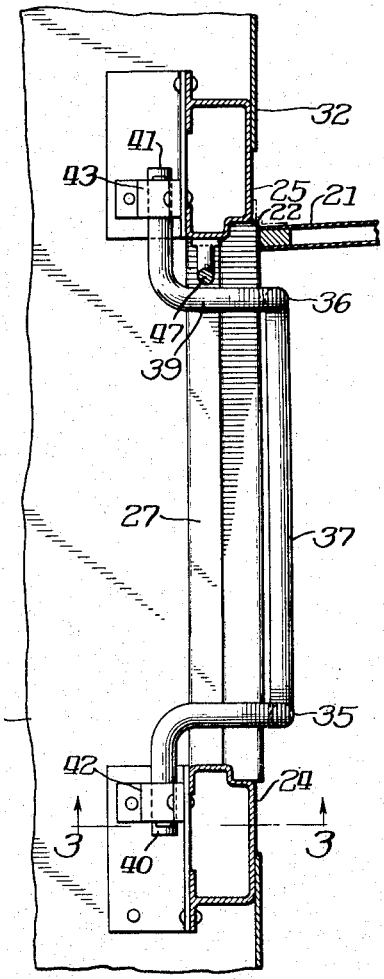
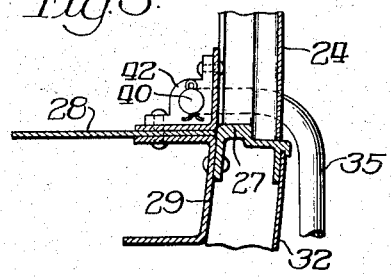
Inventor
Ivar G. Lindstedt
By Wilson, Mann & Cox, Attys April 21, 1936.　　　I. G. LINDSTEDT　　　2,037,805
RETRACTABLE STEP FOR STREAMLINE RAILWAY CARS
Filed Aug. 17, 1934　　　2 Sheets-Sheet 2
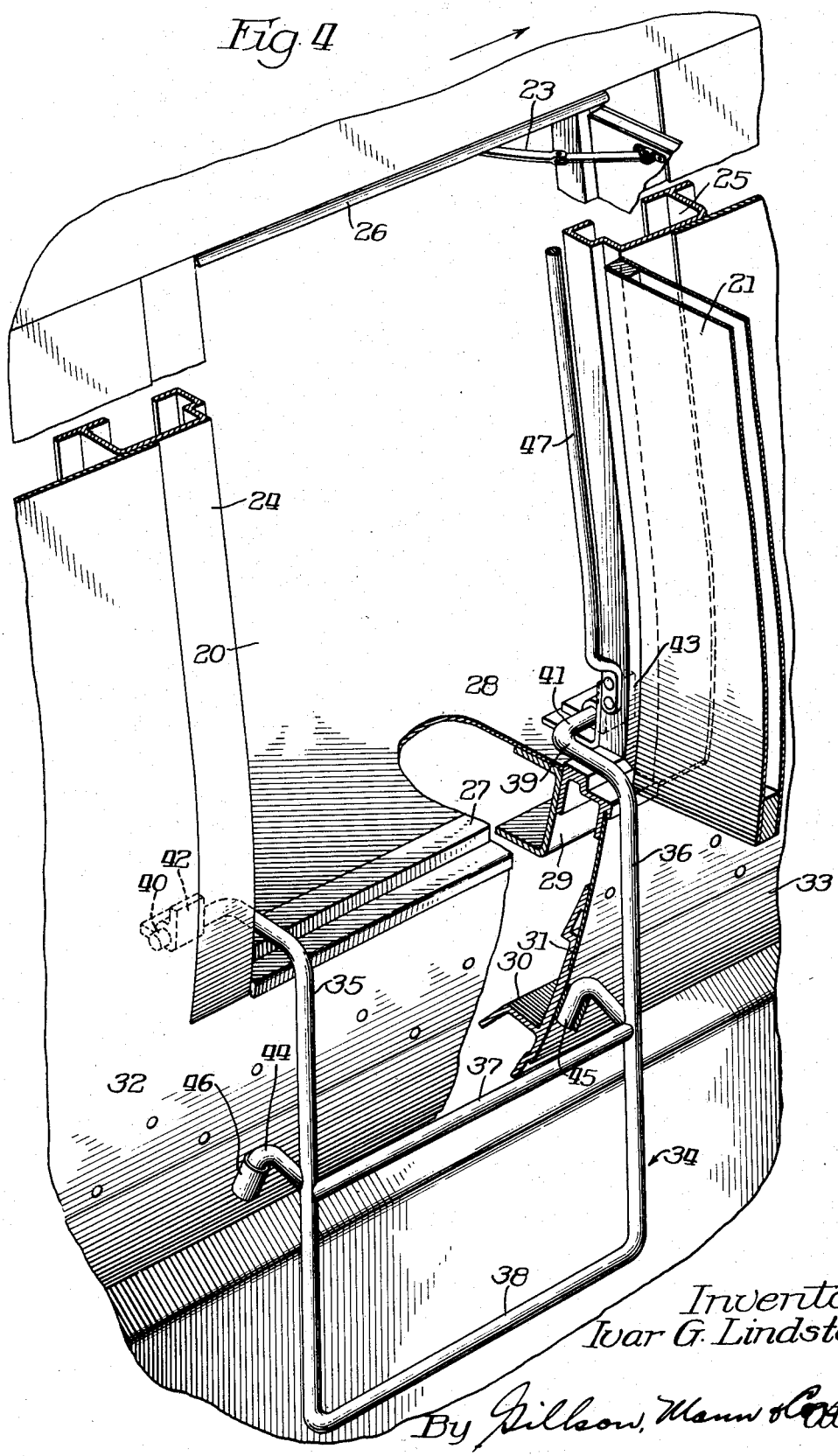
Inventor:
Ivar G. Lindstedt Patented Apr. 21, 1936

2,037,805

UNITED STATES PATENT OFFICE 2,037,805

RETRACTABLE STEP FOR STREAMLINE RAILWAY CARS

Ivar G. Lindstedt, Chicago, Ill., assignor to Pullman-Standard Car Manufacturing Company, Chicago, Ill., a corporation of Delaware Application August 17, 1934, Serial No. 740,333

6 Claims. (Cl. 105—447)

Wind tunnel tests have demonstrated that much of the advantage which results from streamlining railway cars and similar vehicles is lost again by the wind resistance of grab irons, steps, projecting running lights, and other accessories which do not conform to the general streamline shape of the vehicle. It is too often supposed that the resistance caused by such accessories is negligible, but as a matter of fact, the resistance is quite substantial.

The principal object of this invention, therefore, is to provide a retractable ladder or step for access to the interior of a streamline railway car so that when the car is in motion, the ladder or step may be readily drawn into the car interior and thus minimize the wind resistance offered by the car as a whole.

Further and other objects and advantages will become apparent as the disclosure proceeds and the description is read in conjunction with the accompanying drawings, in which Fig. 1 is a sectional view taken through a gas-electric rail car equipped with this invention;

Fig. 2 is a plan section taken on the line 2—2 of Fig. 1;

Fig. 3 is a fragmentary, sectional view taken on the line 3—3 of Fig. 2; and

Fig. 4 is a perspective view showing the retractable ladder in operative position, part of the car structure being broken away;

But this illustration is for the purpose of disclosure only, and the appended claims should be construed as broadly as the prior art will permit.

The invention has been shown as applied to the engine room door of a gas-electric rail car, but with suitable modifications, the invention may be used for passenger doors.

In the illustrative embodiment of the invention, the car is propelled by an internal combustion engine 10 mounted on a bed 11 which is detachable at 12 from the car body, generally indicated at 13, the engine bed including a body bolster 14 supported on a center bearing 15 carried by a truck bolster 16 of a conventional truck, indicated generally at 17. The engine 10 drives a generator (not shown) which supplies current to traction motors on one or more of the car trucks, one of the motors being indicated at 18. A shield 19 is secured to the truck side frame to reduce wind resistance at the trucks.

The car body is generally ovate in cross section and has a doorway 20 in one of its sides which is adapted to be closed by a swinging door 21 hinged at 22 along its forward edge. The extent to which the door may be opened is limited by a stop 23. A sliding door may be used in place of the swinging door, if desired.

The doorway 20 is bounded on its sides by side posts 24 and 25, at the top by a door header 26, and at the bottom by a threshold 27. The threshold 27 is substantially flush with the car floor 28 and is secured to a channel 29 which constitutes part of the car framework. Beneath the channel 29 is a side sill 30 which is inset at 31 so that the outside sheathing 32 will be flush with the exterior face 33 of the side sill.

Since the car floor 28 is some distance from the ground, it is necessary to provide one or more steps for conveniently gaining entrance to the car interior through the doorway 20. In the illustrative embodiment of the invention, the steps take the form of a ladder 34 having sides 35 and 36 connected by rungs 37 and 38, the latter preferably being integral with the two sides. At the threshold, the ladder sides are bent horizontally, as indicated at 39, and terminate in laterally extending trunnions 40 and 41 which are journalled in trunnion bearings 42 and 43 secured to the side posts 24 and 25, respectively. The ladder is equipped with spacer arms 44 which join the sides 35 and 36 at the rung 37 and have downwardly extending ends 45 covered with rubber sleeves 46 for engaging the face 33 of the side sill to hold the ladder in vertical position.

A hand hold 47 is attached along the forward edge of the doorway 20, the direction of car movement being indicated by the arrow in Fig. 4. This hand hold obviates the necessity of employing a grab iron on the outside of the car, and consequently there is some saving in wind resistance.

When the door 21 is to be closed, the ladder 34 is rotated on its trunnions through 180°, bringing the ladder to the full line position shown in Fig. 1. In this position, the ladder is entirely clear of the doorway and the door may be closed.

If desired, one of the ladder trunnions may be equipped with a pedal (not shown) to facilitate the raising of the ladder. The pedal may be loosely mounted on the trunnion and engage a lug on the trunnion to start the rotation.

The invention may be variously modified within the scope of the appended claims.

I claim:—

1. In combination with a doorway of a streamline railway car, a door for said doorway, a handhold secured to the inner margin of said doorway inwardly of said door, a retractable ladder trunnioned on the inside of the doorway and adapted when lowered to extend over the doorway threshold below said handhold and project downwardly, said ladder being rotatable on its trunnions past said handhold to a vertical position within the car and clear of the doorway, whereby when said door is closed said handhold and ladder will be inwardly thereof.

2. In combination with a doorway of a streamline railway car, a retractable ladder trunnioned on the inside of the doorway and adapted when lowered to extend over the doorway threshold and project downwardly, an arm on the ladder adapted to engage the side of the car and hold the ladder in spaced relation thereto, said ladder being rotatable on its trunnions to a vertical position within the car and clear of the doorway.

3. In combination with a doorway of a streamline railway car, retractable steps mounted adjacent to the threshold of the doorway and adapted to swing outwardly and downwardly on a horizontal axis to operative position, said steps being at least partially supported in operative position by the side of the car.

4. A swinging ladder for use in railway cars comprising sides which at the top have horizontal inwardly extending portions terminating in laterally extending trunnion bearings, one or more rungs connecting the said sides, and spacer means extending inwardly from said ladder for holding the same spaced from the side of the car when in lowered position.

5. In combination with a door adapted to close a doorway in a streamline railway car, a retractable ladder mounted on a horizontal pivot adjacent to the door on the inside of the car whereby when in retracted position the door may be closed, said ladder being rotatable to operative position after the door has been opened and being supported in part in operative position by the side of the car.

6. A swinging ladder for use on railway cars comprising a metallic bar bent to form sides and an integral connecting portion forming the bottom rung of the ladder and having its ends offset inwardly and bent laterally to form trunnions, a cross member rigidly connected to intermediate portions of said side members to form a rung of said ladder, and spacer members rigidly connected to said side members adjacent to said cross member and extending inwardly therefrom.

IVAR G. LINDSTEDT.